United States Patent [19]
Shimomura et al.

[11] Patent Number: 5,309,525
[45] Date of Patent: May 3, 1994

[54] IMAGE PROCESSING APPARATUS USING NEURAL NETWORK

[75] Inventors: Yukari Shimomura, Yokohama; Junichi Shishizuka, Tokyo, both of Japan

[73] Assignee: Canon Kabushiki Kaisha, Tokyo, Japan

[21] Appl. No.: 713,312

[22] Filed: Jun. 11, 1991

[30] Foreign Application Priority Data

Jun. 14, 1990 [JP] Japan ................ 2-153935
Jun. 19, 1990 [JP] Japan ................ 2-161901
Jun. 19, 1990 [JP] Japan ................ 2-161902

[51] Int. Cl.$^5$ ................ G06K 9/38; G06K 9/62
[52] U.S. Cl. ........................ 382/50; 382/14; 382/15
[58] Field of Search ............... 382/6, 14, 15, 50-54; 364/274.9, 972.4; 358/455, 458, 459; 395/21; G06K 9/00, 9/38, 9/40, 9/62; H04N 1/04, 1/40; G06F 9/00, 15/00

[56] References Cited

U.S. PATENT DOCUMENTS

| | | | |
|---|---|---|---|
| 4,829,587 | 5/1989 | Glazer et al. ............... | 382/50 |
| 4,912,650 | 3/1990 | Wood ........................ | 364/200 |
| 4,918,618 | 4/1990 | Tomlinson, Jr. .......... | 395/21 |
| 5,058,180 | 10/1991 | Khan ......................... | 382/14 |
| 5,060,278 | 10/1991 | Fukumizu ................... | 382/15 |
| 5,086,479 | 2/1992 | Takenaga et al. ........ | 382/14 |
| 5,091,965 | 2/1992 | Kobayashi et al. ....... | 382/15 |

FOREIGN PATENT DOCUMENTS

63-013578  1/1988  Japan .

OTHER PUBLICATIONS

The Sixth International Congress on Advances in Non-Impact Printing Technologies. Oct. 21, 1990, Orlando, USA, pp. 791-802, Y. Shimomura et al., "High quality multi-level image restoration from bi-level image".

Electronics & Communications in Japan, Part I—Communications, vol. 71, No. 7, Jul. 1988, New York, US, pp. 88-99, H. Ibaraki et al. "New image processing method for halftone pictures".

ICASSP 89: International Conference on Acoustics, Speech, and Signal Processing, vol. 3, May 23, 1989, pp. 1789-1790, S. Kollias et al. "Image halftoning and reconstruction using a neural network".

Primary Examiner—Jose L. Couso
Attorney, Agent, or Firm—Fitzpatrick, Cella, Harper & Scinto

[57] ABSTRACT

Disclosed is an image processing apparatus having an input device for inputting binary image data comprising a plurality of pixels which include a pixel of interest that is to be subjected to multivalued conversion, the plurality of pixels being contained in an area that is asymmetrical with respect to the position of the pixel of interest, and an multivalued converting device for executing processing, by a neural network, to restore the input binary image data to multivalued image data for the pixel of interest, whereby multivalued image data is estimated from binarized image data. It is possible to reduce the number of pixels referred to in arithmetic operations performed in the neural network.

22 Claims, 17 Drawing Sheets

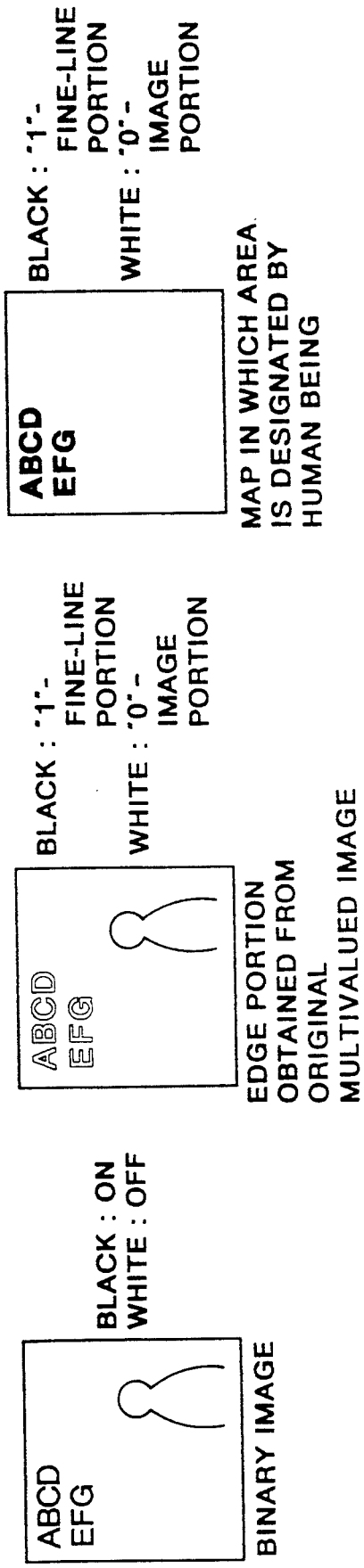
FIG. 8A — BINARY IMAGE
BLACK : ON
WHITE : OFF
FIG. 8B — EDGE PORTION OBTAINED FROM ORIGINAL MULTIVALUED IMAGE
BLACK : "1"- FINE-LINE PORTION
WHITE : "0" - IMAGE PORTION
FIG. 8C — MAP IN WHICH AREA IS DESIGNATED BY HUMAN BEING
BLACK : "1"- FINE-LINE PORTION
WHITE : "0" - IMAGE PORTION

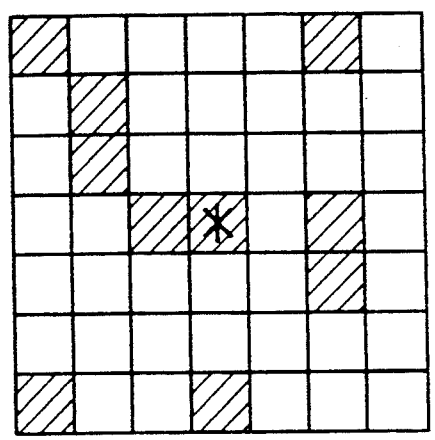
 ON
☐ OFF
✶ PIXEL OF INTEREST
F I G. 9

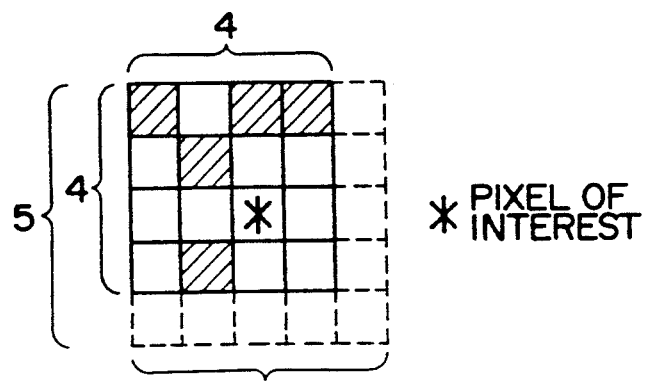
F I G. 12
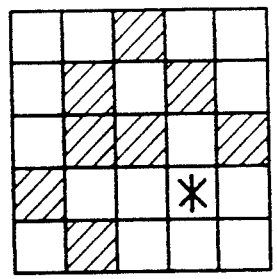 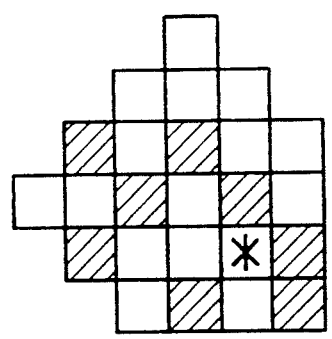
F I G. 13A  F I G. 13B

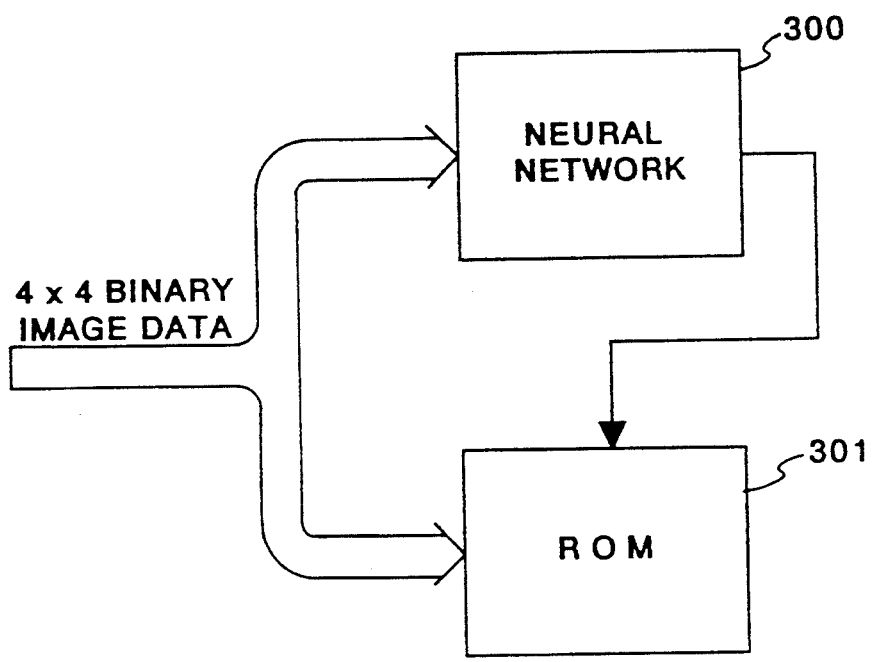
F I G. 14

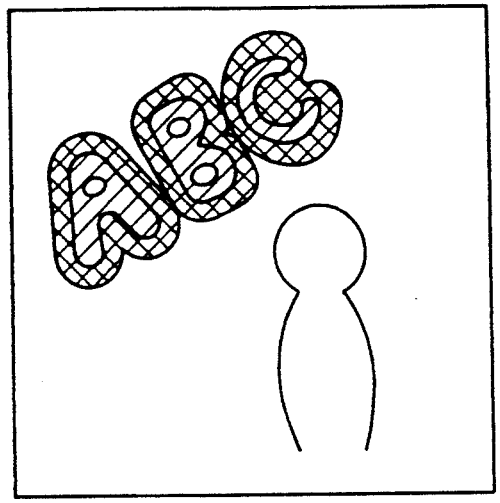
 CHARACTER IMAGE AREA
 HALF-TONE IMAGE AREA
 PHOTOGRAPHIC IMAGE AREA
F I G. 16

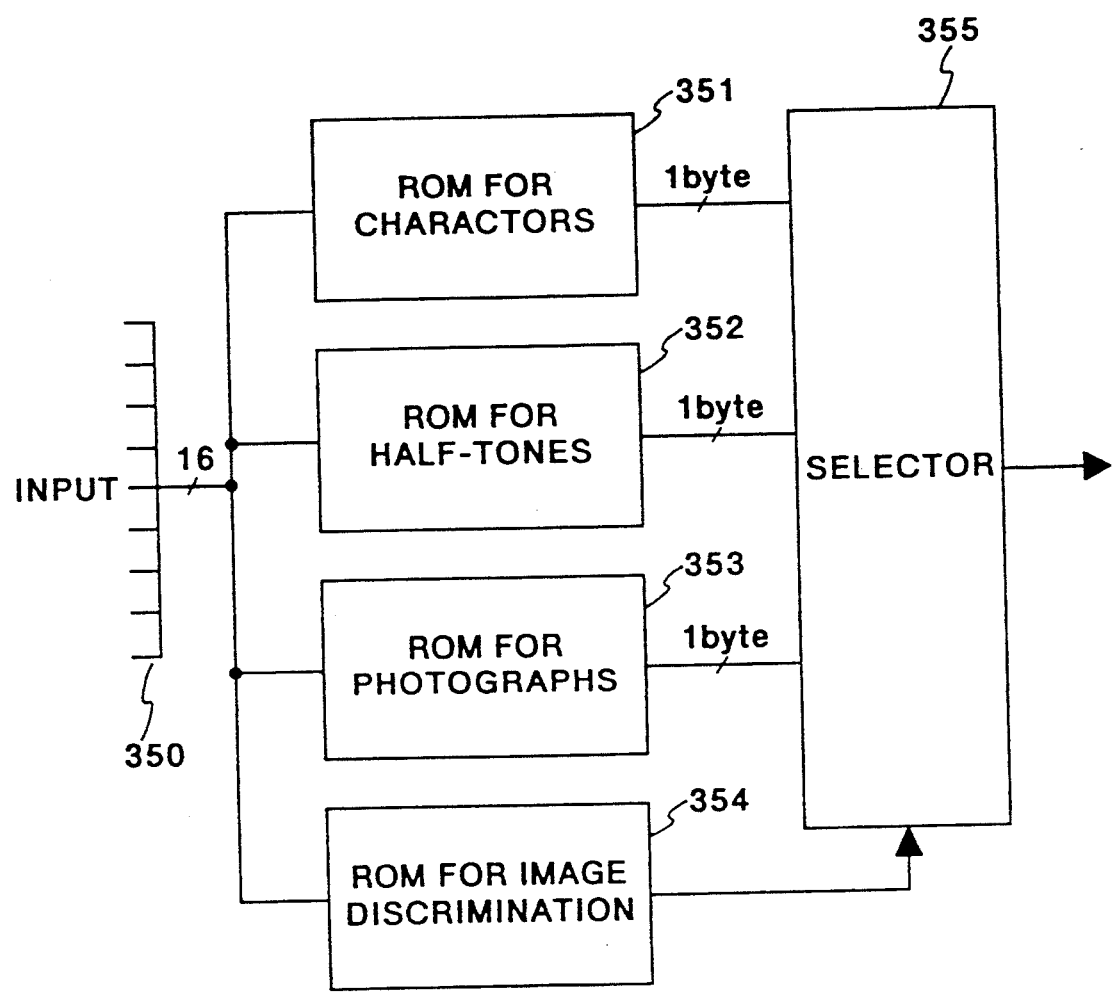
F I G. 17

IMAGE PROCESSING APPARATUS USING NEURAL NETWORK

BACKGROUND OF THE INVENTION

This invention relates to an image processing apparatus which utilizes a neural network to execute processing for restoring an original multivalued image from binarized image information.

One conventional method of executing processing for restoring an original multivalued image from a binarized image is to use a smoothing filter circuit which applies smoothing to an area having a rectangular shape. Another method that has been proposed is to store the results of processing by a smoothing filter in a ROM or RAM as a LUT (look-up table) beforehand in order to reduce circuitry and raise processing speed, and then refer to this table when image processing is performed.

FIG. 1 illustrates a prior-art example of a multiple-value converting apparatus using a LUT which performs the same function as a 3×3 filter. The apparatus includes a line buffer 701 comprising FIFO memories or the like. The line buffer 701 receives an input of binary data from an image input unit (not shown) and accumulates three raster lines of data. A data latch 702 latches three pixels of data for every line from among the three lines of data delivered by the line buffer 701. Binary image data corresponding to a 3×3 window is obtained from the data latch 702. This data of 3×3=9 bits is applied to a ROM-type LUT 703 as address data. The LUT 703, the content of which has been decided beforehand by the output of a smoothing filter, outputs multivalued data of 256 tones (eight bits) corresponding to the input data.

Various problems arise when relying upon such a method using a filter or LUT. For example, when it is attempted to execute processing to restore a binary image to a multivalued image by a 3×3 smoothing filter shown in FIG. 2A, half-tone image portions can be restored to multiple values with comparatively good results, but as shown on the right side of FIG. 3, "blurring" occurs at edge portions (binary images shown on the left side of FIG. 3), at which there is a marked difference in density, as at the fine-line and character portions or the like.

On the other hand, in a case where processing is executed by a smoothing filter which stresses a pixel of interest in order to emphasize fine-line portions, as shown in FIG. 2B, the aforesaid blurring at the fine-line portions is eliminated, but a drawback is that a grainy property peculiar to a binary image strongly remains at half-tone portions. As a consequence of this drawback, a difference in density of the kind shown on the right side of FIG. 4 develops at smooth portions such as background portions and portions corresponding to the human skin, as shown on the left side of FIG. 4.

A method contemplated to solve this problem is to discriminate among areas and to convert fine-line portions and image portions to multiple values separately. However, the state of the art is such that a method of image discrimination based upon binary image data has not yet been established.

The present assignee has proposed, in U.S. Ser. No. 673,240 (filed on Mar. 20, 1991), an image processing method using a neural network. This proposed method entails providing a rectangular window area the center of which is a pixel of interest with regard to restoration, and estimating multivalued data from the binary pattern of an input corresponding to this area by utilizing a neural network. With this method in which the aforesaid window is provided, however, good results cannot be obtained unless the window is large in size. A problem that arises when a large window is provided is that the pixels to be referred to are excessive in number. When a conversion into multiple values is performed using a neural network, the fact that there are a large number of pixels to be referred to results in hardware-related difficulties from the viewpoint of processing speed and the size of the circuitry.

SUMMARY OF THE INVENTION

Accordingly, an object of the present invention is to provide an image processing apparatus using a neural network in which it is possible to reduce the number of pixels to be referred to in processing.

According to the present invention, the foregoing object is attained by providing an image processing apparatus for estimating multivalued image data from binarized image data, comprising input means for inputting binary image data comprising a plurality of pixels which include a pixel of interest that is to be subjected to multivalued conversion, these plurality of pixels being contained in an area that is asymmetrical with respect to the position of the pixel of interest; and multivalued converting means for executing processing, by a neural network, to restore the input binary image data to multivalued image data of the pixel of interest.

In order to estimate a multivalued image from an inputted binarized image in accordance with the image processing apparatus constructed as set forth above, image data of an area which is asymmetrical with regard to a pixel of interest, namely a pixel desired to be subjected to a multivalued conversion is input, and reference is made to an image containing many pixels in directions in which the pixel of interest is readily influenced. As a result, multivalued conversion processing having the same accuracy as that of the prior art can be achieved with fewer referential pixels, and this makes it easy to construct the needed hardware.

According to a preferred embodiment of the present invention, the input binary image data is of an asymmetrical form containing more pixels to the left of the pixel of interest than to the right thereof.

According to a preferred embodiment of the present invention, the input binary image data is of an asymmetrical form containing more pixels above the pixel of interest than below.

According to a preferred embodiment of the present invention, the binary input data is binarized by an error diffusion method. According to binarization using the error diffusion method, an error produced with regard to the pixel of interest is diffused from the position of this pixel of interest toward pixels at positions having an asymmetric distribution.

According to a preferred embodiment of the present invention, the above-mentioned area has a size of 4×4, and the pixel of interest is located at position (3,3).

According to a preferred embodiment of the present invention, the above-mentioned area has a size of 5×5, and the pixel of interest is located at position (4,4).

According to a preferred embodiment of the present invention, the above-mentioned area is of an asymmetrical form containing more pixels to the upper left of the pixel of interest than to the lower right thereof.

According to a preferred embodiment of the present invention, the neural network has one input layer, one intermediate layer and one output layer.

According to a preferred embodiment of the present invention, there is provided an image processing apparatus for restoring a binary image in which a fine-line and a character portion and an image portion are mixed, comprising: discriminating means for discriminating input binary image data by a first neural network to determine whether the image data is indicative of the fine-line and a character portions or the image portion; first restoring means for applying multivalued restoration processing, by a second neural network, to the fine-line and character portions contained in the input binary image data; second restoring means for applying multivalued restoration processing, by a third neural network, to the image portion contained in the input binary image data; and control means for performing control based upon the results of discrimination by the discriminating means in such a manner that the multivalued restoration processing is executed by either the first or second restoring means.

Thus, in order to estimate a multivalued image from an input binarized image, image discrimination is performed using a neural network to determine whether the input data is indicative of the fine line and character portions or of an image portion. Based upon the results of discrimination, a multivalued conversion is performed by the multivalued converting means provided for the character portion or image portion. As a result, the fine-line and character portions are subjected to a multivalued conversion while preserving the edge of the character. In case of a half-tone image, the image is subjected to a multivalued conversion while the graininess produced by binarization is eliminated. Accordingly, the original multivalued image can be reproduced with considerable accuracy. In addition, since image discrimination regarding character portions and image portions is carried out by a neural network, the discrimination takes into account the positional relationship among dots as well as connecting information, unlike processing by the conventional filter. This makes possible considerably accurate image reconstruction.

According to a preferred embodiment of the present invention, the number of referential pixels of the first neural network of the discriminating means is greater than the numbers of referential pixels of the second and third neural networks of the first and second restoring means, respectively.

According to a preferred embodiment of the present invention, the first, second and third neural networks are replaced by tables when coupling coefficients within the neural networks are decided by learning.

Another object of the present invention is to provide a learning method in an image processing apparatus using a neural network to restore image data, which contains a mixture of fine-line portions and half-tone image portions, to multivalued image data, wherein the learning is performed in an efficient manner.

According to the present invention, the foregoing object is attained by providing a learning method in an image processing apparatus comprising: input means for inputting binary image data; first restoring means for applying multivalued restoration processing, by a first neural network, to a fine-line and character portions contained in the input binary image data; and second restoring means for applying multivalued restoration processing, by a second neural network, to an image portion contained in the inputted binary image data; the learning method comprising: a step of preparing inputs of binary image data and of ideal output data each containing a fine-line and character portions and a half-tone portion; a step of preparing a map which contains data indicating whether a portion is the fine-line portion or the half-tone portion in the binary image data and ideal output data; and a step of inputting the inputs of input binary image data and of the ideal output data to either of the two neural networks based upon values in the map, and learning coupling coefficients between neurons, of the neural network to which the data has been input.

In other words, the items of input binary image data and ideal output data are made to share the same fine-line portion and half-tone portion, and which of the first and second neural networks is to undergo learning is decided based upon the values in the map.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 8A is a diagram showing an example of input data entered when the apparatus of FIG. 5 undergoes learning;

FIGS. 8B and 8C are diagrams showing examples of ideal output data entered when an image-discriminating neural network in the apparatus of the embodiment shown in FIG. 5 undergoes learning;

FIG. 9 is a diagram showing an example of binary data;

FIG. 12 is a diagram for describing a window structure in a case where the objective is to reduce the number of referential pixels;

FIGS. 13A and 13B are diagrams for describing another window structure in a case where the objective is to reduce the number of referential pixels;

FIG. 14 is a block diagram showing the construction of an apparatus for creating ROM data after the coupling coefficients of a neural network have been decided;

FIG. 16 is a diagram for describing input image data which is input to a neural network in order to decide image-processing ROM data and image-discrimination ROM data in a case where the present invention is applied to image processing of an image having different picture qualities;

FIG. 17 is a block diagram showing the construction of an image processing apparatus for a case where the present invention is applied to image processing of an image having different picture qualities and FIG. 18 is a block diagram showing the construction of an apparatus for creating ROM data for image discrimination.

DESCRIPTION OF THE PREFERRED EMBODIMENT

A preferred embodiment of an image processing apparatus according to the present invention will now be described while referring to the accompanying drawings. In this embodiment, the back-propagation method is applied to a neural network.

Construction of the Image Processing Apparatus

Figures 1, 2A, 2B:
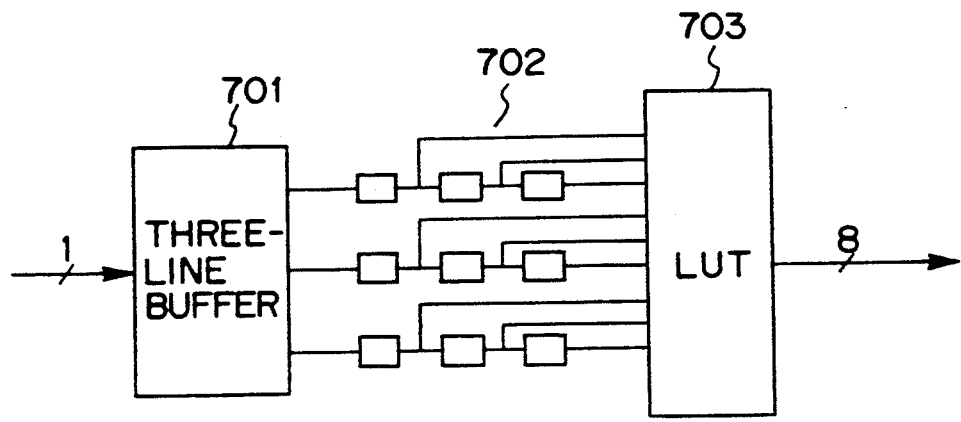
FIG. 1 is a diagram showing an example of an apparatus for a binary-multivalued conversion according to the prior art.
FIGS. 2A and 2B are diagrams showing examples of smoothing filters according to examples of the prior art.
Figure 3:
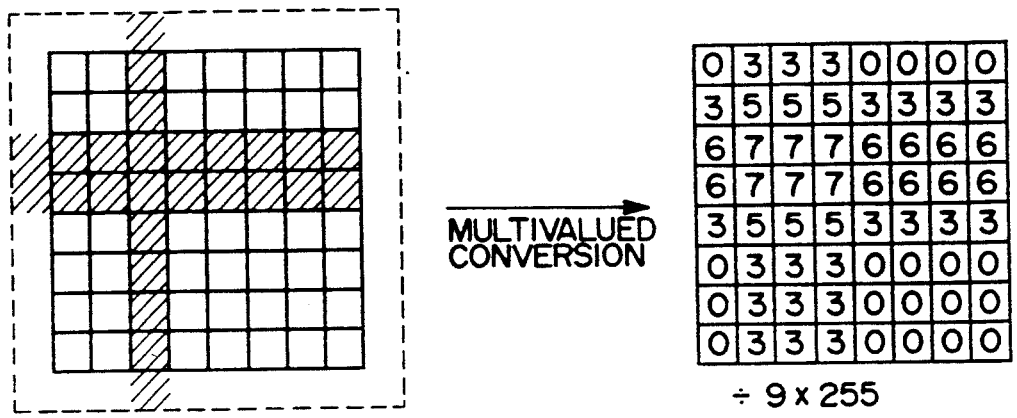
FIG. 3 is a diagram showing an example of a multivalued conversion of an edge portion according to the prior art.
Figure 4:
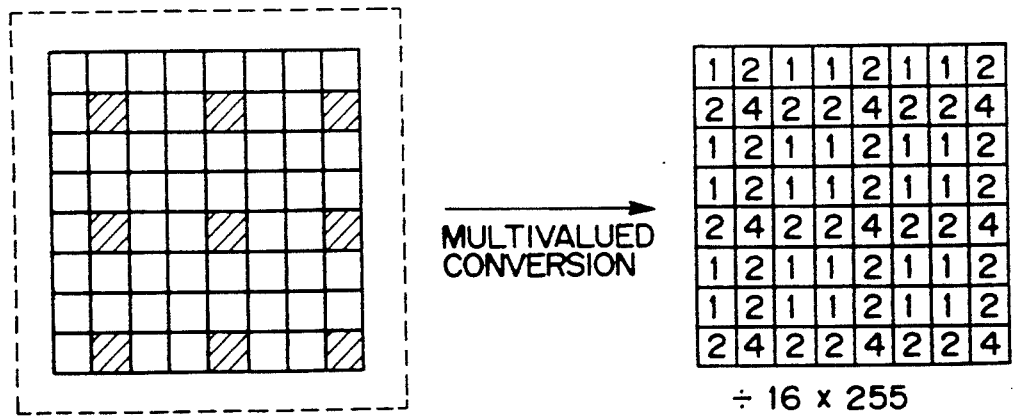
FIG. 4 is a diagram showing an example of a multivalued conversion of a half-tone portion according to the prior art.
Figure 5:
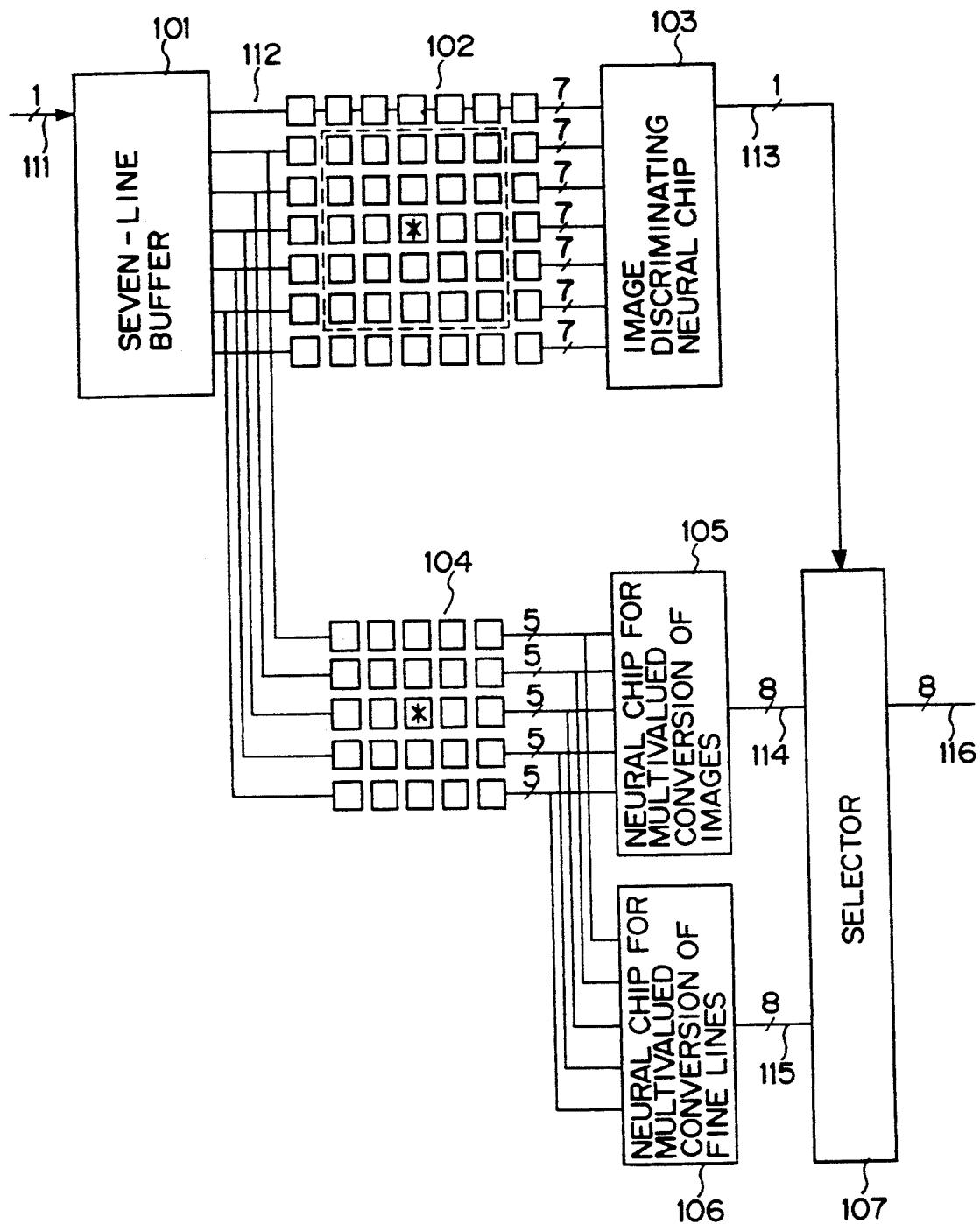
FIG. 5 is a block diagram showing the construction of a preferred embodiment of an image processing apparatus according to the present invention.

FIG. 5 is a block diagram illustrating the construction of the embodiment. The apparatus includes a line buffer 101 comprising FIFO memories or the like. The line buffer 101 receives an input of binary data from an image input unit (not shown) and accumulates seven raster lines of data. A data latch 102 latches seven pixels of data for every line from among the seven lines of data delivered by the line buffer 101. Binary image data corresponding to a window having a size of 7×7 (=49 bits) is obtained from the data latch 102. In the latch group 102 of FIG. 5, the pixel marked by the "*" symbol is the pixel of interest.

The data of 49 bits enters an image discriminating circuit 103. The latter outputs "0" when the 49-bit data is indicative of a half-tone image, and "1" when the 49-bit data is indicative of a fine-line portion. This output value, shown at numeral 113, is a selection control signal applied to a selector 107.

From among the outputs produced by the line buffer 101, those on the five centrally located lines are supplied to a data latch 104. The latter, which is composed of 5×5 (=25) latches, latches the 25 bits of data the center whereof is the pixel of interest (marked by "*"). This 25-bit data enters both a multivalued converting circuit 105 for half-tone images and a multivalued converting circuit 106 for fine lines. The multivalued converting circuits 105, 106 each output one item of eight-bit multivalued data. These outputs enter the selector 107. The latter, which is under the control of the control signal 113 from the image discriminating circuit 103, operates so as to deliver the output data of the multivalued converting circuit 105 when the result of image discrimination indicates a half-tone image, and the output data of the multivalued converting circuit 106 when the result of image discrimination indicates a fine line.

The foregoing units are under the control of a CPU, which is not shown.

In the image processing apparatus of FIG. 5, a so-called neural chip employing a neural network is used in the image discriminating circuit 103, the multivalued converting circuit 105 for half-tone images, and the multivalued converting circuit 106 for fine lines.

The image processing apparatus of FIG. 5 has the following characterizing features:

(1) the accuracy of image discrimination is raised by using a neural network in the image discrimination processing of a binary image; and (2) highly precise multivalued conversion processing can be expected with fewer referential pixels in comparison with an image binarized by an error-maintaining-type binarizing technique.

In a case where a neural network is used in data processing, learning accuracy is affected by processing accuracy. Learning in a neural network refers to optimizing the coupling coefficients between neurons. Once learning has been completed, the prescribed data processing can be expected if the coupling coefficients are set (fixed) at their optimum values. When the coupling coefficients have been fixed, it is possible for arithmetic operations in the neurons of the neural network to be put into the form of a ROM (or table).

Learning in a Neural Network

A general procedure for back-propagation-type learning in a neural network will be described taking a neural network shown in FIG. 6 as an example.

General Learning Procedure

Figure 6:
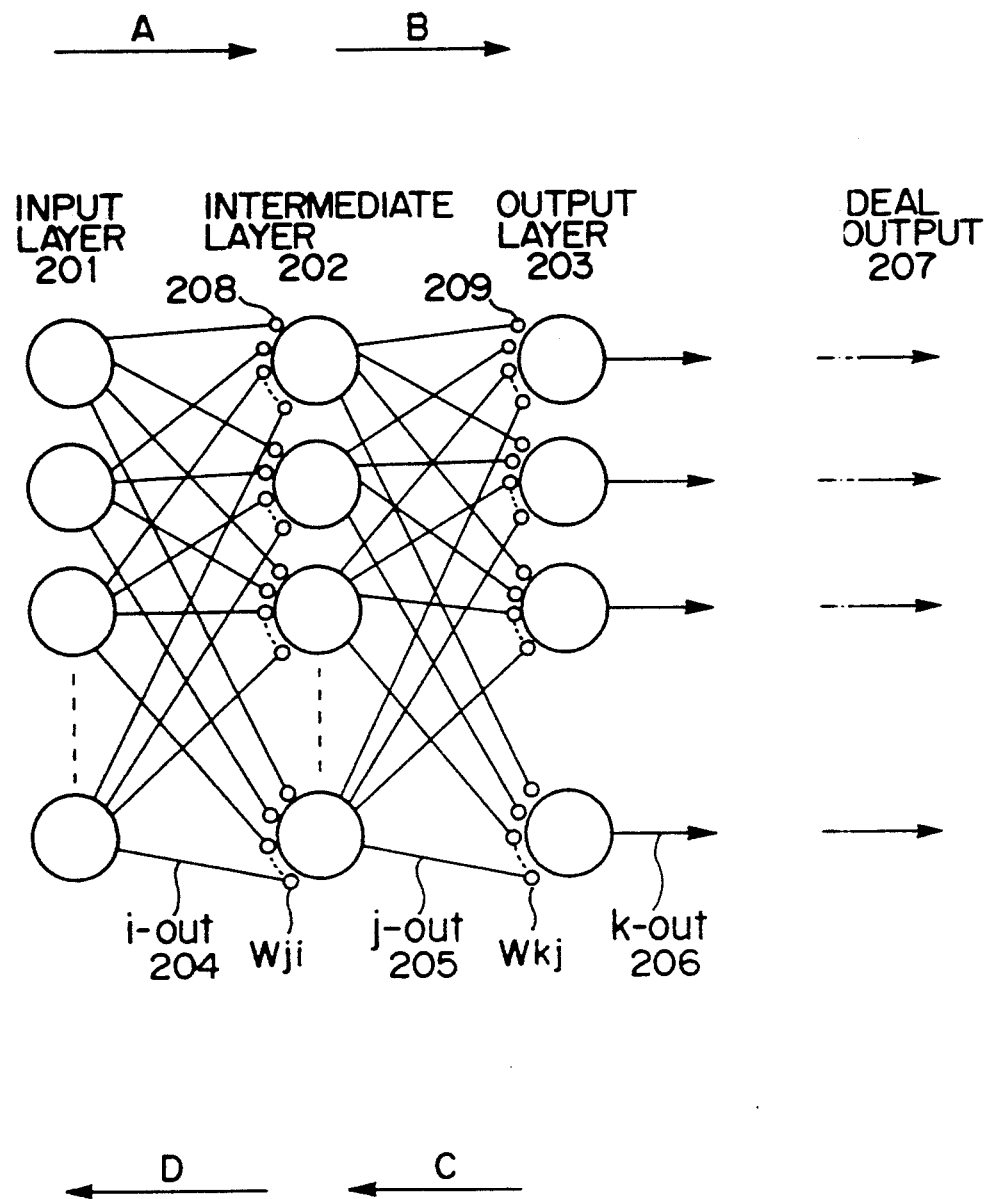
FIG. 6 is a conceptual view of a neural network.

The neural network illustrated in FIG. 6 has an input layer 201 (composed of i-number of neurons) which produces outputs (i-out) 204 that enter an intermediate layer 202 (composed of j-number of neurons) comprising a signal layer. The intermediate layer 202 produces outputs (j-out) 205 that enter an output layer 203 (composed of k-number of neurons), which delivers outputs (k-out) 206. Ideal outputs (ideal-out) are shown at numeral 207.

In a case where the neural network of FIG. 6 is applied to the image discriminating neural chip 103, for example, the number i of neurons in the input layer 201 will be 49. When the neural network is applied to the multivalued converting neural chips 105, 106, the number i of neurons will be 25. The number k of neurons in the output layer 203 in each of these three neural chips will be 1 (i.e., k=1). The neural network of FIG. 6 is configured to show the general character of a neural network.

In order to carry out learning in a neural network according to back-propagation, "input data" and an "ideal output" (ideal-out) corresponding to the input data are prepared. By comparing this ideal output and the output (k-out) of the output layer, a coupling coefficient $W_{ji}$ (208 in FIG. 6) in the intermediate layer and a coupling coefficient $W_{kj}$ (209 in FIG. 6) in the output layer are decided.

As shown in FIG. 6, the coupling between one neuron and the neurons in another layer is represented by the solid lines. The coupling between two layers (referred to as a "preceding layer" and a "succeeding layer" hereinafter) specifically means that the output of a neuron in the preceding layer is input to neurons in the succeeding layer, where the output is subjected to an arithmetic operation. The small circles in FIG. 6 represent arithmetic operations based upon a coupling coefficient W.

Learning in a neural network refers to deciding the coupling coefficient $W_{ji}$ between the input and intermediate layers and the coupling coefficient $W_{kj}$ between the intermediate and output layers. In order to perform such learning, first the input data for learning and the corresponding ideal output (ideal-out) are prepared in advance, and the initial values of the coupling coefficient $W_{ji}$ in the intermediate layer and the coupling coefficient $W_{kj}$ in the output layer are decided appropriately. This is the preliminary stage of learning. Next, the prepared input data is applied to the network coupled based upon the initial values, whereupon these items of data are processed in the intermediate layer to obtain the outputs (j-out) 205 from the intermediate layer. The outputs are applied to the output layer 203 (composed of k-number of neurons), which delivers the outputs (k-out) 206. The procedure up to this point is indicated by the flow of arrows A and B in FIG. 6. Next, the outputs (k-out) 206 obtained from the output layer and the prepared ideal outputs (ideal-out) 207 are compared, a teach signal (a teach signal for the output layer) is generated by the comparison, and the coupling coefficient $W_{kj}$ in the output layer is corrected by the teach signal. This process is indicated by arrow C in FIG. 6. Further, a teach signal for the intermediate layer is generated to correct the coupling coefficient $W_{ji}$ in the intermediate layer. This is the process indicated by arrow D in FIG. 6.

The foregoing is the first step of learning. By repeating this learning process, the coupling coefficients $W_{ji}$, $W_{kj}$ are successively corrected toward appropriate values. As the result of learning, the updated coupling coefficients are maintained within the network. Learning is stipulated by the "input data" and "ideal output" prepared. If the "ideal output" is multivalued image data and the "input data" is data obtained by binarizing this multivalued image data, then a neural network which has undergone learning based upon these items of data should function as a network appropriate for converting a binary image into a multivalued image (i.e., as a network appropriate for restoring a multivalued image from a binary image).

The learning procedure set forth above will now be described in further detail with reference to FIGS. 7A and 7B.

First, at step S402, the initial values of weighting coefficients (coupling strengths) $W_{ji}$, $W_{kj}$ are applied. In consideration of convergence in the learning process, values in the range $-0.5$ to $+0.5$ are selected.

Next, at step S404, input data iout(i) for learning is selected, and this data iout(i) is set in the input layer at step S406. If this network is to be utilized in image processing, the input data iout(i) is image data of one pixel. An ideal output (ideal-out) corresponding to the input data iout(i) is prepared at step S408. The foregoing steps constitute the preliminary stage.

Next, the output jout(j) of the intermediate layer is obtained in the following manner at step S410.

First, the data iout(i) from the input layer is multiplied by the weighting coefficient $W_{ji}$ of the intermediate layer, and the sum $Sum_{Fj}$ thereof is calculated in accordance with $$Sum_{Fj} = \sum_i W_{ji}(j,i) \cdot iout(i) \quad (1)$$

Next, $Sum_{Fj}$ is subjected to a sigmoid function and the j-th output jout(j) of the intermediate layer is calculated in accordance with $$jout(j) = \frac{1.0}{1.0 + \exp(-Sum_{Fj})} \quad (2)$$

Next, the output kout(k) of the output layer is obtained at step S411. This procedure is similar to that of step S410. Specifically, the output jout(j) from the intermediate layer is multiplied by the weighting coefficient $W_{kj}$ of the output layer, and the sum $Sum_{Fk}$ thereof is calculated in accordance with $$Sum_{Fk} = \sum_j W_{kj}(k,j) \cdot jout(j) \quad (3)$$

Next, $Sum_{Fk}$ is subjected to a sigmoid function and the k-th output kout(k) of the intermediate layer is calculated in accordance with $$kout(k) = \frac{1.0}{1.0 + \exp(-Sum_{Fk})} \quad (4)$$

These output values jout(j), kout(k) are normalized by the sigmoid function.

This is followed by step S412, at which the output kout(k) obtained by the foregoing and the ideal output ideal_out(k) prepared at step S408 are compared and the following is obtained as the teach signal teach_k(k) of the output layer:

$$teach\_k(k) = \{ideal\_out(k) - kout(k)\} \cdot kout(k) \cdot \{1 - kout(k)\} \quad (5)$$

Here $kout(k) \cdot \{1 - kout(k)\}$ is defined as the differential of the sigmoid function kout(k).

Next, at step S414, a change $\Delta W_{kj}(k,j)$ in the weighting coefficient of the output layer is calculated in accordance with $$\Delta W_{kj}(k,j) = \beta \cdot jout(j) \cdot teach\_k(k) + \alpha \cdot \Delta W_{kj}(k,j) \quad (6)$$

Here $\alpha$ represents a constant referred to as a stabilizing constant, and $\beta$ represents a constant referred to as a learning constant. These function to suppress a sudden change in $\Delta W_{kj}(k,j)$.

The weighting coefficient $W_{kj}(k,j)$ is updated as follows at step S415 based upon the aforementioned change $\Delta W_{kj}(k,j)$:

$$W_{kj}(k,j) = W_{kj}(k,j) + \Delta W_{kj}(k,j) \quad (7)$$

This constitutes the first cycle of learning of the weighting coefficient $W_{kj}$ between the intermediate layer and output layer.

Next, at step S416, the teach signal teach_j(j) of the intermediate layer is computed. To this end, the contribution in the backward direction from the output layer to each element of the intermediate layer is computed based upon $$Sum_{Bj} = \sum_k teach\_k(k) \cdot W_{kj}(j,i) \quad (8)$$

Next, the teach signal teach j(j) of the intermediate layer is computed from $Sum_{Bj}$ in accordance with the following equation:

$$teach\_j(j) = jout(j)*\{1 - jout(j)\}*Sum_{Bj} \quad (9)$$

Next, at step S418, a change $\Delta W_{ji}(j,i)$ in the weighting coefficient of the intermediate layer is calculated in accordance with $$\Delta W_{ji}(j,i) = \beta*iout(j)*teach\_j(j) + \alpha*\Delta W_{ji}(j,i) \quad (10)$$

The weighting coefficient $W_{kj}(j,i)$ is updated as follows at step S420 based upon the aforementioned change $\Delta W_{ji}(j,i)$:

$$W_{ji}(j,i) = W_{ji}(j,i) + \Delta W_{ji}(j,i) \quad (11)$$

Thus, learning is performed.

Thus, by virtue of steps S402 through S420, the weighting coefficients $W_{ji}$, $W_{kj}$ are learned one time from one set of input data and the corresponding ideal output.

It is determined at step S422 whether the foregoing learning has been carried out with regard to all input data. If learning is still incomplete, the processing of steps S402 through S420 is repeated.

It is determined at step S424 whether the number of learning cycles has attained the prescribed number. If the number of learning cycles is still inadequate, the processing of steps S402 through S422 is repeated.

The foregoing is a description of a learning procedure of a common neural network based upon the back-propagation method.

The learning described above constitutes a preliminary stage for image processing. In actual image processing, only the coupling coefficients obtained are used.

This learning is applied to the three neural networks of the image processing apparatus illustrated in FIG. 5. In other words, if learning is performed in such a manner that the image discriminating neural chip 103 is applied to image discrimination, the neural chip 105, which is for converting a binary image that was originally a half-tone image, is applied to such multivalued conversion, and the neural chip 105, which is for converting a binary image that was originally a fine-line portion, is applied to such multivalued conversion, then the image processing apparatus of FIG. 5 will act as a neural network system capable of restoring a multivalued image while fine-line and character portions are discriminated from half-tone image portions.

Figure 7A:
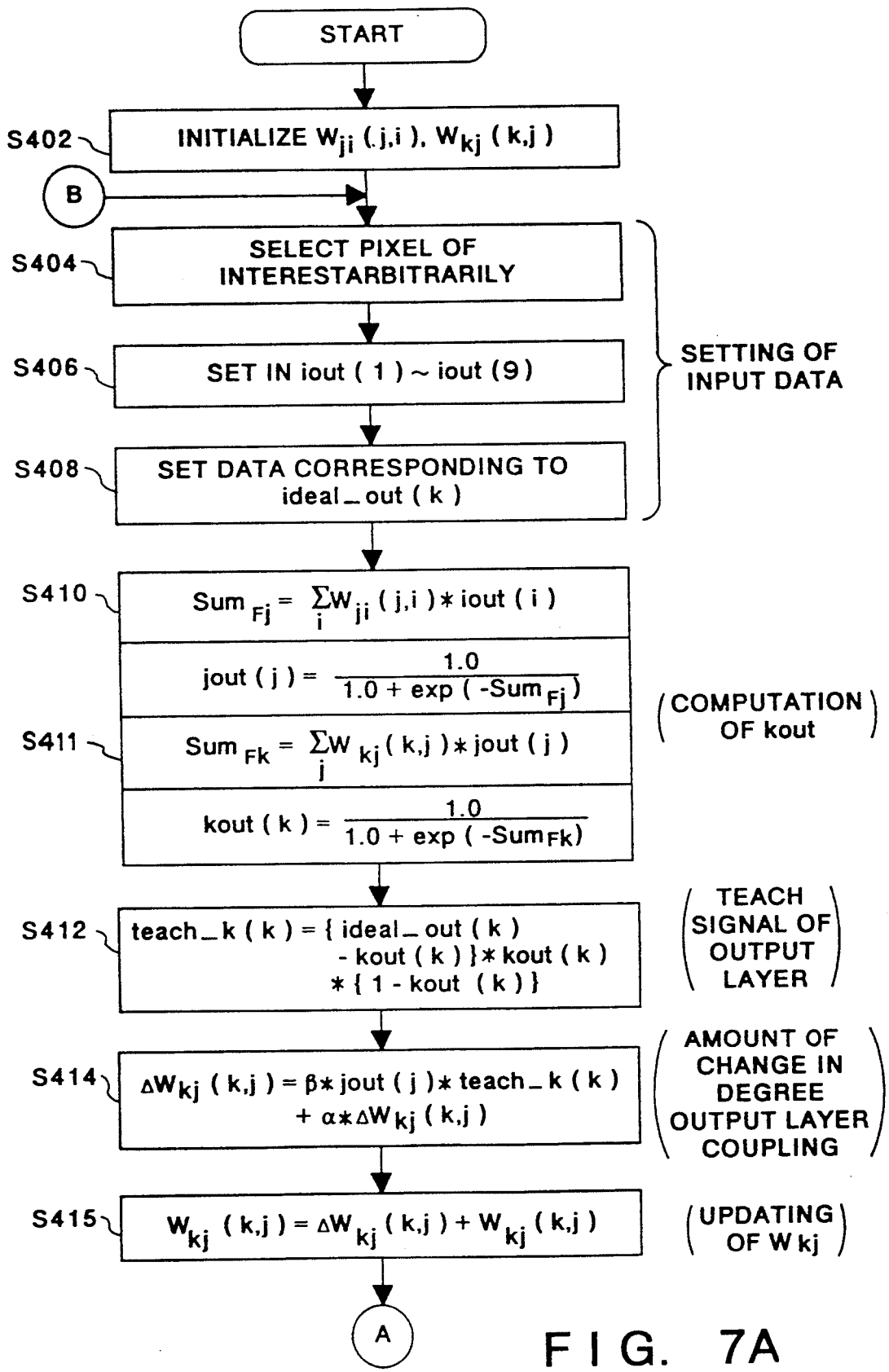
FIGS. 7A and 7B are flowcharts showing a learning procedure of a neural network.
Figure 7B:
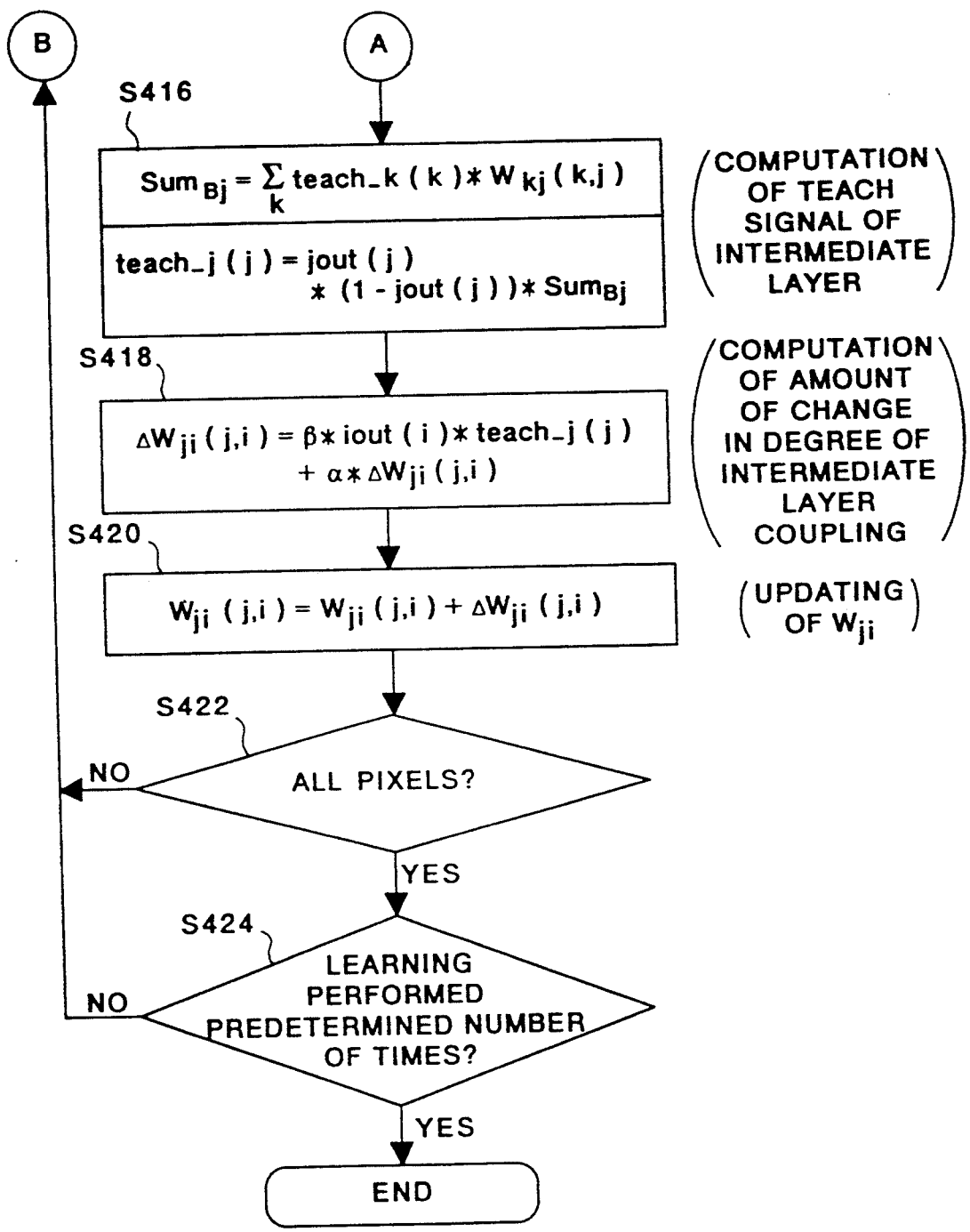
Figure 7C:
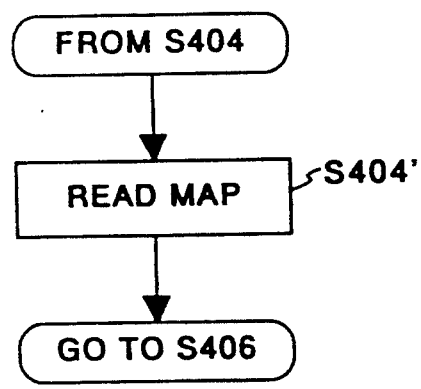
FIGS. 7C and 7D are flowcharts for describing a learning procedure according to a modification.

FIGS. 6, 7A and 7B illustrate the general learning procedure for a neural network. In order to perform learning for the image processing apparatus shown in FIG. 5, some specialization is necessary to bring the description of FIGS. 7A and 7B into conformity with the system of FIG. 5. This specialization will now be described.

Learning for Image Discrimination

Learning for the image discriminating neural chip 103 will be described.

First, the learning input data for the image discriminating neural chip 103 is composed of 49 pixels (having logic values of "0" or "1") in a 7×7 window the center of which is the pixel of interest. (These pixels are from the binary image data.) Accordingly, the number of neurons in the input layer of the image discriminating neural chip 103 is 49. Since the image discriminating neural chip 103 should output "1" when the input image is a fine-line portion and "0" when the input image is a half-tone image portion, the number of neurons in the output layer is one. There can be any number of neurons in the intermediate layer, though the number is 25 in this embodiment.

FIG. 8A illustrates an example of input data for learning. This example illustrates a binary image obtained by binarizing, using a predetermined binarizing method, an original image in which characters "ABCDEFG" are written at the upper left and a photograph of a human being appears at the lower right. A map of binary values ("1" and "0") of the kind shown in FIG. 8B or 8C is prepared as ideal output data for learning. The example of FIG. 8B is a map obtained by applying an edge detecting filter to an original multivalued image. In FIG. 8B, black (=1) portions indicate fine-line portions (edge portions), and white (=0) portions indicate half-tone image portions. Further, the example of ideal-output data in FIG. 8C is a map in which an area is designated artificially. The difference between the ideal output data of FIG. 8B and that of FIG. 8C is that fine-line (edge) portions are set at the periphery of the character portions and at the periphery of the photograph of the human being in FIG. 8B, whereas the entirety of the character portions are made fine-line portions and all other portions are made half-tone image portions in FIG. 8C.

As for the method of selecting input data for image discrimination, a learning pixel is selected randomly, a 7×7 window having this pixel at its center is proved, and the pixels in this window are adopted as the input data. This is illustrated in FIG. 9.

The learning procedure described in connection with FIGS. 7A and 7B is executed using this learning data, the procedure is repeated until the learning values converge, and the coupling coefficients which prevail at convergence are decided as the parameters of image discrimination for the neural chip 103.

When an actual image to be processed is inputted to the image processing apparatus of FIG. 5, outputs of 0–1.0 are obtained from the output layer of the chip 103. The output obtained is compared with a threshold value (=0.5). An image is determined to be a fine-line portion when output $\geq 0.5$ holds and a half-tone image when output $< 0.5$ holds.

Learning for Multivalued Conversion

Described next will be learning for obtaining coupling coefficients for multivalued conversion in the multivalued converting neural chips 105, 106. A characterizing feature of learning in the multivalued converting neural chips according to this embodiment is that common use is made of the ideal output data employed in both of these chips.

In order to perform learning, first a multivalued image (an image of the kind shown in FIG. 10B, for example) is used as the ideal output, and then an image (the image of FIG. 10A), which is obtained by binarizing the multivalued image using a prescribed method of binarization processing, is used as the input data. In this embodiment, the 25 items of data in a 5×5 window having the pixel of interest as its center are used in order to perform the multivalued conversion both when an image is a fine-line portion and when an image is a half-tone image portion. Accordingly, the number of input-layer neurons in each of the neural networks 105 and 106 is 25, and the number of neurons in the output layer in these networks is one. Though the intermediate layer can have any number of neurons, the number is 15 in this embodiment.

The initial values of the coupling coefficients at step S402 of FIG. 7A will now be described. Here random values in the range −0.5 through 0.5 are applied as initial values for learning of the fine-line portions and of the half-tone image portions.

Figures 10A, 10B, 10C:
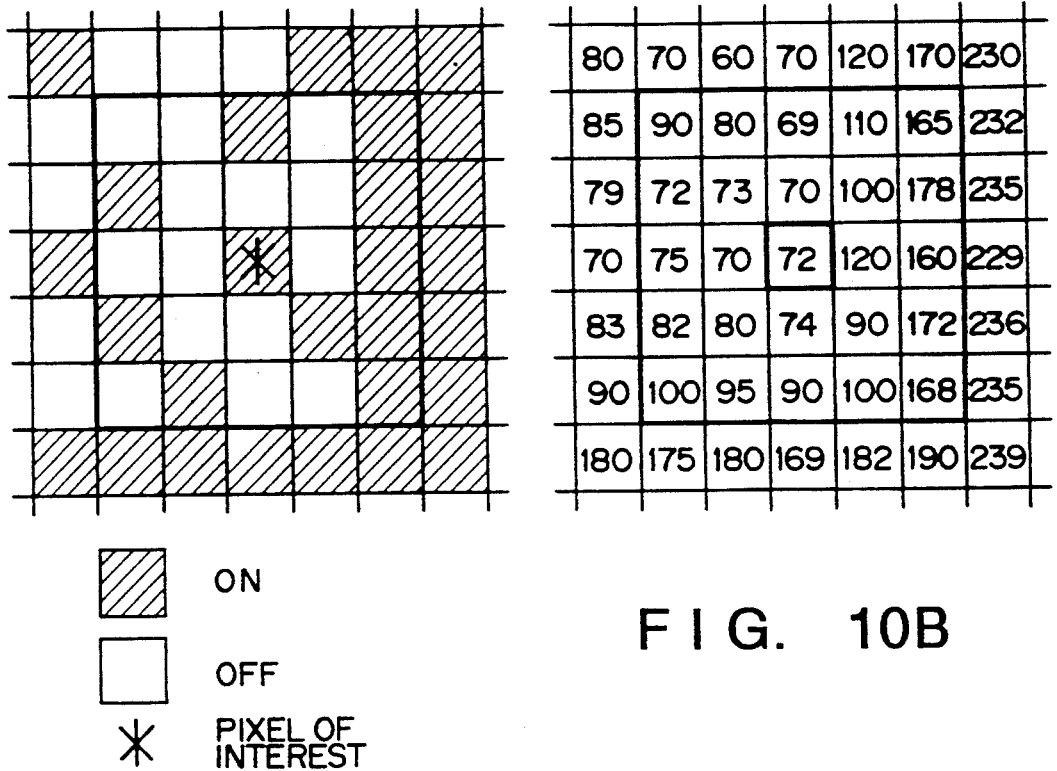
FIGS. 10A through 10C are diagrams for describing learning of a multivalued conversion.

As for the input data, a pixel of interest (indicated by "*") is randomly selected in the image of FIG. 10A, a 5 ×5 window having this pixel at its center is provided, and the binary image data within this window is adopted as the input data.

Figure 11:
FIG. 11 is a diagram showing the relationship between multivalued data and ideal output data.
Figure 15:
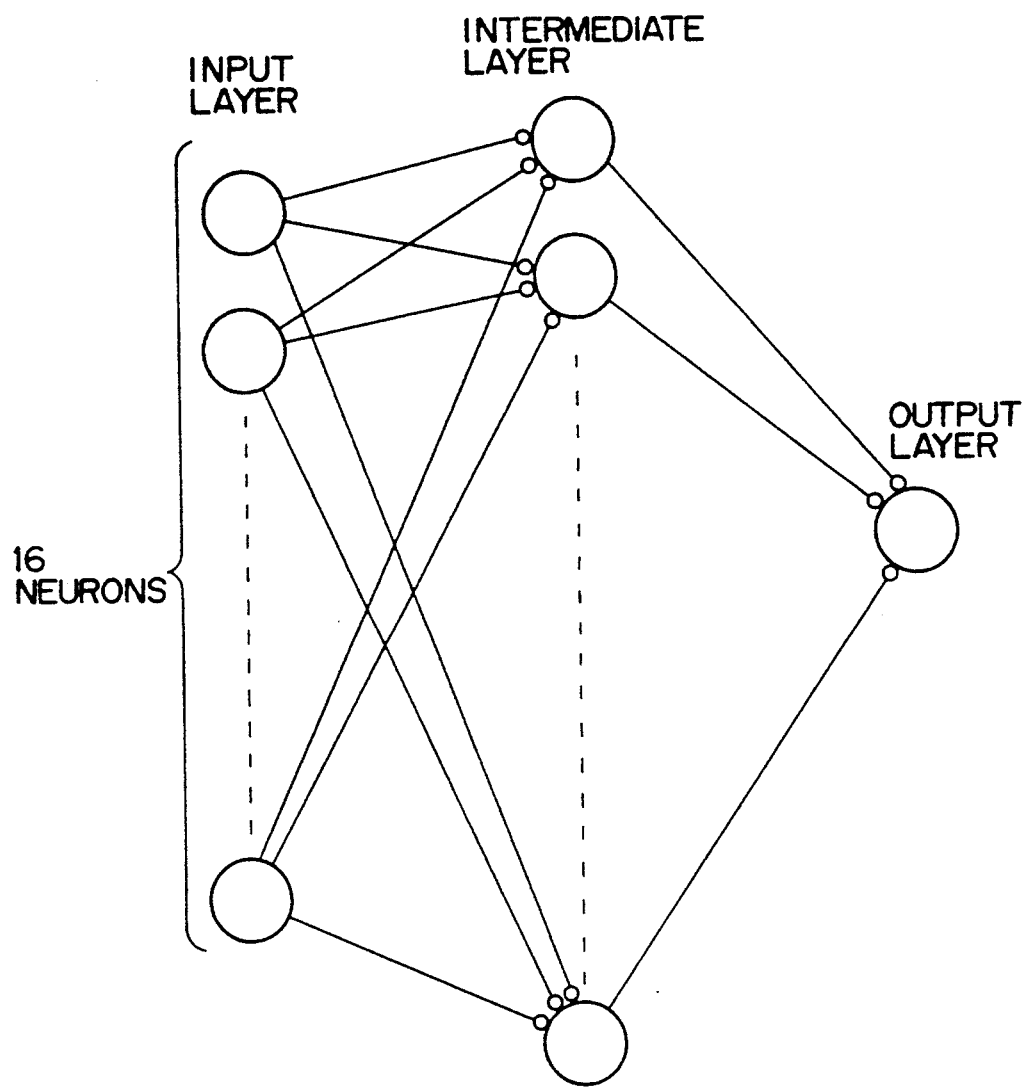
FIG. 15 is a diagram for describing the structure of a neural network to be put into the form of a ROM.
Figure 18:
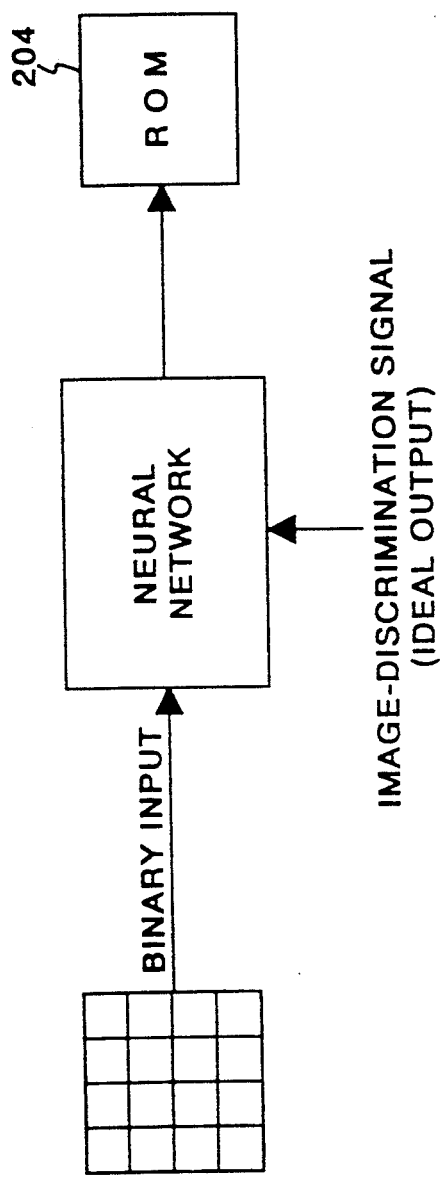

FIG. 11 is a diagram for describing normalization of the ideal output data (ideal_out). This normalization of the ideal output data is performed by normalizing the density D (0–255) of each pixel in FIG. 10B in accordance with the following formula:

$$ideal\_out = \frac{D}{255} \times 0.8 + 0.1$$

Adopting of Common Data for Input Data and Ideal Output Data

In the examples of FIG. 8 and 10, the items of input data and ideal output data used in learning of the neural network 105 for multivalued conversion of a half-tone portion and in learning of the neural network 106 for fine-line portions are peculiar to each learning process. Accordingly, consideration has been given to adopting common data for the input data and ideal output data used in the learning processes of the neural chips 105, 106. The reason is that if common data can be employed, this will make it possible to perform learning in the two neural chips simultaneously. To attain this goal, it is necessary to prepare a map which indicates whether the origins of the input data and ideal output data are a fine-line portion or half-tone portion. Such a map is illustrated in FIG. 10C. This map corresponds to the image discrimination maps shown in FIGS. 8B and 8C and is obtained from results acquired when the multivalued image of FIG. 10B is subjected to image discrimination by a prescribed filter. Specifically, as shown in FIG. 10C, the map has a "1" if the result of discrimination indicates a fine line and a "0" if the result of discrimination indicates a half-tone.

In order to adopt common data for the input data and ideal output data, some revision of the flowchart shown in FIG. 7 is necessary. First, if the position of the pixel of interest has been set at step S404 in FIG. 7A, the value in the map (FIG. 10C) corresponding to the position of this pixel of interest is read at step S404' in FIG. 7C. If this value is "1", it is judged that the coupling coefficient of the fine-line portion should be learned in the procedure set forth below; if the value is "0", is it judged that the coupling coefficient of the half-tone portion should be learned. In the examples of FIGS. 10A through 10C, the value (the center position in FIG. 10C) in the map corresponding to the pixel at the "*" position in FIG. 10A is "0". How the other control steps will change if the items of input data and ideal output data are rendered common will be described with reference to FIG. 7D using step S412 as an example.

Figure 7D:
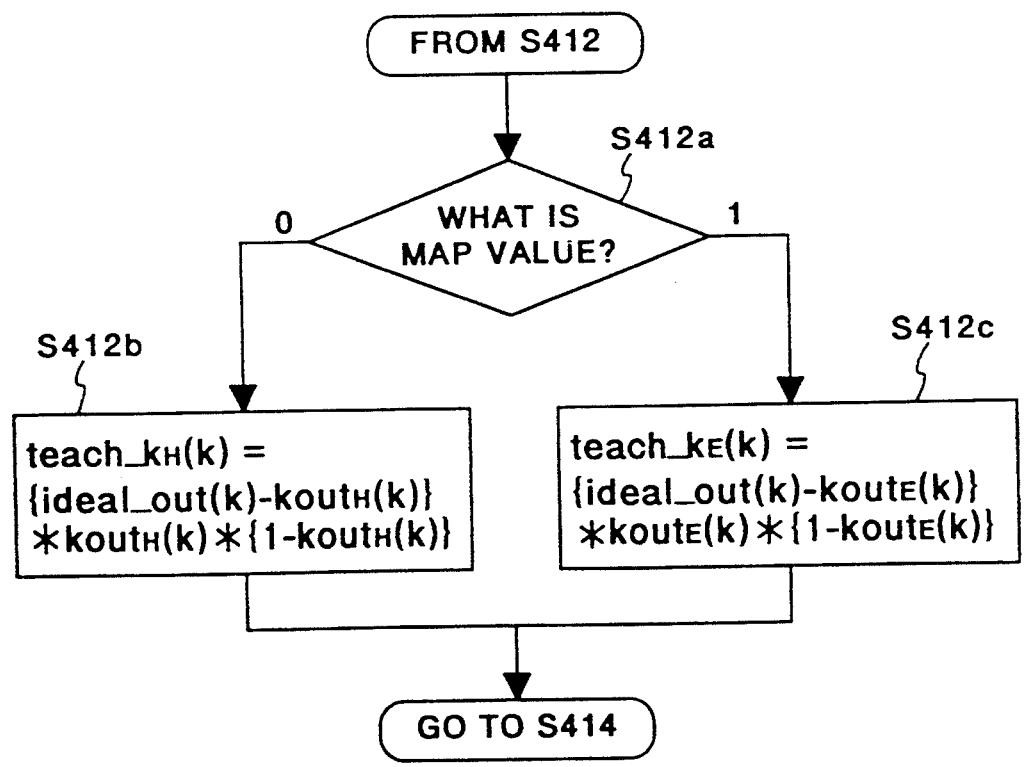

In the flowchart of FIG. 7D, it is determined at step S412a whether the map value is "0" or "1". Let ideal_out(k) represent an ideal output that has been made common; let teach_$k_E$(k) and kout$_E$(k) represent the teach signal and an intermediate-layer output for a fine-line portion, respectively; and let teach_$k_H$(k) and kout$_H$(k) represent the teach signal and an intermediate-layer output for a half-tone portion. Then, if the map value is "1", this means that learning of a fine-line portion will be carried out, and the following teach signal is generated at step S412c:

$$teach\_k_E(k) = \{ideal\_out(k) - kout_E(k)\} * kout_E(k) * \{1 - kout_E(k)\}$$

Conversely, if the map value is "0", the following teach signal is generated at step S412b:

$$teach\_k_H(k) = \{ideal\_out(k) - kout_H(k)\} * kout_H(k) * \{1 - kout_H(k)\}$$

If the teach signal for the fine-line portion of half-tone portion is thus computed, the amount of change $\Delta W_{Ekj}$ or $\Delta W_{Hkj}$ of the coupling coefficient of the fine-line portion or half-tone portion is computed at step S414, and the coupling coefficient (between the intermediate layer and the output layer) $W_{Ekj}$ or $W_{Hkj}$ of the fine-line portion or half-tone portion is computed at step S415.

By repeating the foregoing procedure, learning for the coupling coefficients (parameters) of multivalued conversion regarding the fine lines and half-tones can be performed simultaneously.

By means of the foregoing, the above-described learning procedure is repeated until the values converge, and the coupling coefficients which prevail at convergence are set as the parameters of image discrimination.

Advantages of the Apparatus of FIG. 5

The image processing apparatus described above has the following advantages:

(1) In order to estimate a multivalued image from an inputted binarized image, a fine-line, character and half-tone image portions are discriminated using neural networks and, based upon the results of discrimination, a multivalued conversion is performed by the multivalued converting units provided for respective ones of the character portion and image portion. As a result, the fine-line portion is subjected to a multivalued conversion while preserving the edge of the lines. In case of a half-tone image, the image is subjected to a multivalued conversion while the graininess produced by binarization is eliminated. Accordingly, the original multivalued image can be reproduced with considerable accuracy.

(2) Since image discrimination regarding character fine-line portions and image portions is carried out by neural networks, the discrimination takes into account the positional relationship among dots as well as connecting information, unlike processing by the conventional filter. This makes possible considerably accurate image reconstruction.

(3) Learning is made more efficient by performing the learning for the neural network (105), which is used to restore fine-line portions, and the learning for the neural network (106), which is used to restore half-tone portions, simultaneously.

Modification of the Apparatus of FIG. 5

In the conversion from a binary value to multiple values, learning of the coupling coefficients in image discrimination can be executed by a 5×5 window having the pixel of interest at its center. This will make it possible to raise processing speed, although there will be a slight decline in accuracy. Conversely, it is also possible to enlarge the size of the window. Further, window size can be changed for every target area even in multivalued conversion. For example, a 7×7 can be used for half-tones and a 5×5 window for fine-line portions.

In the foregoing embodiment, the learning of coupling coefficients for both fine-line portions and half-tone image portions is carried out one time using a map. However, it is permissible to adopt an arrangement in which image data solely for fine-line portions and image data solely for half-tone image are prepared and learned separately.

In order to eliminate unnaturalness in the multivalued conversion of a boundary portion between two areas, it is permissible to use coupling coefficients learned simultaneously for both the fine-line portions and half-tones thereby to obtain coupling coefficients used in the multivalued conversion of the fine-line portions.

Improvement in Multivalued-Image Restoration Processing

While optimally separating a binary image containing fine-line portions and half-tone portions, the image processing apparatus of FIG. 5 estimates the original multivalued image from the binary image and performs a multivalued restoration. When the estimation is made, the number of referential pixels reaches 5×5=25 pixels in the above-described example. However, in the improvement described below, the number of pixels referred to at the time of estimation is reduced in a case where the binarizing method is of the information preserving type, such as the error diffusion method.

In the error diffusion method or in a mean-density approximating method, binarizing is performed upon distributing a density error, which accompanies the binarization of a certain pixel, to the pixels located to the right and exactly below this pixel. In a case where it is attempted to subject an imaged binarized by such binarizing processing to multivalued conversion processing, the density D of the pixel of interest can be expressed as follows:

$$D = (\text{error from the pixel to the left}) + (\text{error from the pixel above}) + (\text{pixel's own error}) + \alpha$$

where $\alpha$ is the error received from another pixel owing to a diffusion matrix used in case of the error diffusion method. More specifically, in a binarizing method which preserves density, the influence which the pixel of interest receives from the left and from above is strong. Accordingly, when a multivalued image is estimated from binarized image data, emphasis should be placed upon the pixels to the left of and above the pixel of interest. That is, in order to estimate a multivalued image from an input binarized image, image data of an area that is asymmetric with respect to the pixel desired to be subjected to the multivalued conversion should be input, and reference should be made to an image containing many pixels in directions in which the aforementioned pixel is readily influenced. If such an expedient is adopted, multivalued conversion processing of the same accuracy can be executed with fewer referential pixels. This makes it simpler to configure the hardware.

As for the input data for learning in this method of improvement, the input data is constituted by the values ("0"s or "1"s) of 16 pixels in a 4×4 window of the image data binarized using the error diffusion method. Accordingly, the neurons of the input layer are 16 in number, and there is only one neuron in the output layer because the multivalued output is that for a single pixel. Though the intermediate layer can have any number of neurons, the number is 12 in this embodiment.

As for the ideal output for learning in this improvement, the data is constituted by multivalued image data, namely the original image composed of binarized input data for learning. Further, with regard to the method of selecting the input data for learning, the pixel of interest is selected at random, a 4×4 window is provided, as in FIG. 11, with respect to this pixel, and the data of the pixels in the window is given. The 4×4 window bounded by the solid line in FIG. 12 contains many pixels above and to the left of the pixel of interest, which is represented by the "*" symbol. In comparison with the 5×5 window in the example of FIG. 10A, the fifth row and fifth column of pixels are unnecessary. That is, there are nine fewer referential pixels in comparison with the neural networks according to the embodiment of FIG. 5.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for estimating multivalued image data from binary image data converted by a binarizing method which exerts a large influence on surrounding multivalued pixels in specific directions with respect to a multivalued pixel undergoing binarization by the method, comprising:

input means for inputting binary image data comprising a plurality of pixels which include a pixel of interest that is to be subjected to multivalued conversion, the plurality of pixels being arranged so that a number of binary pixels in a first specific direction with respect to the position of the pixel of interest is larger than that of pixels in a direction other than the first specific direction, the pixels in the first specific direction being ones having a large influence upon the pixel of interest; and multivalued converting means for executing processing, using a neural network, to restore the input binary image data to multivalued image data for the pixel of interest, wherein said neural network comprises:

an input layer which includes a plurality of neurons for inputting the binary image data from the input means in individual pixel units;

an intermediate layer which includes a plurality of neurons, connected to the input layer, for receiving outputs from the neurons of the input layer; and an output layer having one neuron, connected to the intermediate layer, for receiving outputs from the neurons of the intermediate layer and outputting one multivalued image data as image data of the pixel of interest.

2. The apparatus according to claim 1, wherein the input binary image data contains more pixels to the left of the pixel of interest than to the right thereof.

3. The apparatus according to claim 1, wherein the inputted binary image data contains more pixels above the pixel of interest than below.

4. The apparatus according to claim 1, wherein the input binary image data is binarized by means of an error diffusion method.

5. The apparatus according to claim 1, wherein said area has a size of 4×4, and the pixel of interest is located at position (3,3).

6. The apparatus according to claim 1, wherein said area has a size of 5×5, and the pixel of interest is located at position (4,4).

7. The apparatus according to claim 1, wherein said area contains more pixels to the upper left of the pixel of interest than to the lower right thereof.

8. The apparatus according to claim 1, wherein learning in said neural network is performed according to a back-propagation method.

9. The apparatus according to claim 8, wherein said learning comprises the steps of:
preparing inputs of binary image data and an ideal output;
inputting the inputs of binary image data and ideal output to said neural network and learning coupling coefficients between neurons of the network;
inputting input image data to the neural network after learning and obtaining an output from the neural network, thereby deciding a conversion table in which this input image data serves as an input and the output from said neural network serves as an output; and
substituting said table for said neural network.

10. The apparatus according to claim 8, wherein the ideal output is original multivalued image data which the binary image is converted from.

11. An image processing apparatus for estimating multivalued image data from binarized image data, comprising:
input means for inputting binary image data comprising a plurality of pixels which include a pixel of interest that is to be subjected to multivalued conversion, the plurality of pixels being contained in an area that is asymmetrical with respect to the position of the pixel of interest; and
multivalued converting means for executing processing, using a neural network, to restore the input binary image data to multivalued image data for the pixel of interest,
wherein said multivalued converting means further comprises:
discriminating means for discriminating the inputted binary image data by a first neural network to determine whether the image data is indicative of a fine-line and a character portion or of an image portion;
first restoring means for applying multivalued restoration processing, by a second neural network, to the fine-line and the character portions contained in the input binary image data;
second restoring means for applying multivalued restoration processing, by a third neural network to the image portion contained in the input binary image data; and
control means or controlling the multivalued restoration processing to be executed by a proper one of said first or said second restoring means, based upon the results of discrimination by said discriminating means.

12. The apparatus according to claim 11, wherein the number of referential pixels of said first neural network is greater than the numbers of referential pixels of said second and said third neural networks.

13. An image processing method for a neural network of estimating multivalued image data from binary image data converted by a binarizing method which exerts a large influence on surrounding multivalued pixels in specific directions with respect to a multivalued pixel under binarization by the method, said method comprising the steps of:
inputting binary image data to an input layer of the neural network in individual pixel units, the binary image data comprising a plurality of pixels which include a pixel of interest that is to be subjected to multivalued conversion, the plurality of pixels being arranged so that a number of binary pixels in a first specific direction with respect to the position of the pixel of interest is larger than that of pixels in a direction other than the first specific direction, the pixels in the first specific direction being ones having a large influence upon the pixel of interest;
processing data output from the input layer in an intermediate layer of the neural network which includes a plurality of neurons;
processing data output from the intermediate layer in an output layer in the neural network which includes one neuron; and
outputting one multivalued data from the output layer as a multivalued image data of the pixel of interest.

14. The method according to claim 12, wherein the input binary image data contains more pixels to the left of the pixel of interest than to the right thereof.

15. The method according to claim 12, wherein the input binary image data contains more pixels above the pixel of interest than below.

16. The method according to claim 12, wherein the input binary image data is binarized by means of an error diffusion method.

17. The method according to claim 12, wherein the area has a size of 4×4, and the pixel of interest is located at position (3,3).

18. The method according to claim 12, wherein the area has a size of 5×5, and the pixel of interest is located as position (4,4).

19. The method according to claim 12, wherein the area contains more pixels to the upper left of the pixel of interest than to the lower right thereof.

20. The method according to claim 12, wherein learning in the neural network is performed according to a back-propagation method.

21. The method according to claim 20, wherein the learning comprises the steps of:
preparing inputs of binary image data and an ideal output;
inputting the inputs of binary image data and ideal output to the neural network and learning coupling coefficients between neurons of the network;
inputting input image data to the neural network after learning and obtaining an output from the neural network thereby deciding a conversion table in which this input image data serves as an input and the output from the neural network serves as an output; and
substituting the table for the neural network.

22. The method according to claim 20, wherein the ideal output is original multivalued image data which the binary image is converted from.

* * * * *

UNITED STATES PATENT AND TRADEMARK OFFICE
CERTIFICATE OF CORRECTION

PATENT NO. : 5,309,525
DATED : May 3, 1994
INVENTOR(S) : YUKARI SHIMOMURA, ET AL.

Page 1 of 2

It is certified that error appears in the above-identified patent and that said Letters Patent is hereby corrected as shown below:

ON TITLE PAGE

In [56] References Cited, under U.S. PATENT DOCUMENTS:
"4,912,650  3/1990  Wood" should read
--4,912,652  3/1990  Wood--.
In [56] References Cited, under OTHER PUBLICATIONS:
In "Electronics & Communications, etc.",
"Part I—Communications" should read --Part I--.
In [57] ABSTRACT, Line 8, "an" should read --a--.

IN THE DRAWINGS

Sheet 5 of 17, Fig. 7A:
"INTERESTARBITRARILY" should read
--INTEREST ARBITRARILY--.
Sheet 16 of 17, Fig. 17:
"CHARACTORS" should read --CHARACTERS--.

COLUMN 3

Line 52, "with" should read --with- --.

COLUMN 4

Line 12, "rons," should read --rons--.

COLUMN 5

Line 16, "qualities and" should read --qualities; and--.

COLUMN 11

Line 57, "is it" should read --it is--.

UNITED STATES PATENT AND TRADEMARK OFFICE
CERTIFICATE OF CORRECTION

PATENT NO. : 5,309,525

DATED : May 3, 1994

INVENTOR(S) : YUKARI SHIMOMURA, ET AL.

It is certified that error appears in the above-identified patent and that said Letters Patent is hereby corrected as shown below:

COLUMN 13

Line 45, "imaged" should read --image--.

COLUMN 15

Line 66, "or" should read --for--.

COLUMN 16

Line 32, "claim 12," should read --claim 13,--.
Line 35, "claim 12," should read --claim 13,--.
Line 38, "claim 12," should read --claim 13,--.
Line 40, "claim 12," should read --claim 13,--.
Line 43, "claim 12," should read --claim 13,--.
Line 45, "as" should read --at--.
Line 46, "claim 12," should read --claim 13,--.
Line 49, "claim 12," should read --claim 13,--.

Signed and Sealed this

Twenty-second Day of November, 1994

BRUCE LEHMAN

Attest:

Attesting Officer

Commissioner of Patents and Trademarks